(12) United States Patent
Inoue et al.

(10) Patent No.: US 12,741,659 B2
(45) Date of Patent: Sep. 22, 2026

(54) DRIVING ASSISTANCE FUNCTION PROPOSAL SYSTEM AND PROPOSAL METHOD FOR DRIVING ASSISTANCE FUNCTION PROPOSAL SYSTEM

(71) Applicant: TOYOTA JIDOSHA KABUSHIKI KAISHA, Toyota (JP)

(72) Inventors: Hisanobu Inoue, Kawasaki (JP); Hironori Ito, Tokyo (JP); Takahiro Kawano, Chofu (JP); Toshifumi Iwase, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/643,219

(22) Filed: Apr. 23, 2024

(65) Prior Publication Data

US 2024/0359701 A1 Oct. 31, 2024

(30) Foreign Application Priority Data

Apr. 27, 2023 (JP) ................................ 2023-073003

(51) Int. Cl.
*B60W 50/14* (2020.01)
*G06Q 30/0251* (2023.01)

(52) U.S. Cl.
CPC ......... *B60W 50/14* (2013.01); *G06Q 30/0266* (2013.01); *B60W 2050/143* (2013.01);
(Continued)

(58) Field of Classification Search
CPC ........... B60W 50/14; B60W 2050/143; B60W 2050/146; B60W 2520/10;
(Continued)

(56) References Cited

U.S. PATENT DOCUMENTS

2006/0061461 A1* 3/2006 Li ........................ G06V 20/582 340/936
2019/0111941 A1 4/2019 Hori
(Continued)

FOREIGN PATENT DOCUMENTS

| | | | | |
|---|---|---|---|---|
| GB | 2592034 A * | 8/2021 | ............ | B60W 40/08 |
| JP | 2018-005604 A | 1/2018 | | |
| JP | 2019-074803 A | 5/2019 | | |

*Primary Examiner* — Brian A Zimmerman
*Assistant Examiner* — Cal J Eustaquio
(74) *Attorney, Agent, or Firm* — Dinsmore & Shohl LLP

(57) ABSTRACT

A driver feeling bothered due to a proposal of unnecessary driving assistance functions is curbed. A driving assistance function proposal system for acquiring an operation history of a driving assistance function including position information from a plurality of probe vehicles and proposing use of the driving assistance function corresponding to a proposal point set on the basis of the operation history to a driver of a proposal target vehicle when a determination is made that the proposal target vehicle reaches the proposal point, in which the driving assistance function proposal system does not propose the use of the driving assistance function to the driver when a prior use frequency or the number of prior uses of the driving assistance function of the proposal target vehicle at the proposal point is equal to or greater than a proposal unnecessariness threshold.

9 Claims, 7 Drawing Sheets

(52) U.S. Cl.
CPC ... *B60W 2050/146* (2013.01); *B60W 2520/10* (2013.01); *B60W 2556/05* (2020.02); *B60W 2556/10* (2020.02); *B60W 2556/45* (2020.02)

(58) Field of Classification Search
CPC ......... B60W 2556/05; B60W 2556/10; B60W 2556/45; B60W 2540/20; B60W 50/00; B60W 60/0051; B60W 50/08; G06Q 30/0266
See application file for complete search history.

(56) References Cited

U.S. PATENT DOCUMENTS

2022/0324461 A1* 10/2022 Kuehnle ............ G01C 21/3617
2022/0332347 A1* 10/2022 Rottkamp ............. B60W 10/18

* cited by examiner 3
30
ECU
31
VEHICLE POSITION RECOGNITION UNIT
32
VEHICLE INFORMATION TRANSMISSION UNIT
33
PROPOSAL UNIT
34
DRIVING ASSISTANCE EXECUTION UNIT
ACTUATOR
27
HMI
26
GNSS RECEPTION UNIT
21
EXTERNAL SENSOR
22
INTERNAL SENSOR
23
MAP DATABASE
24
COMMUNICATION UNIT
25

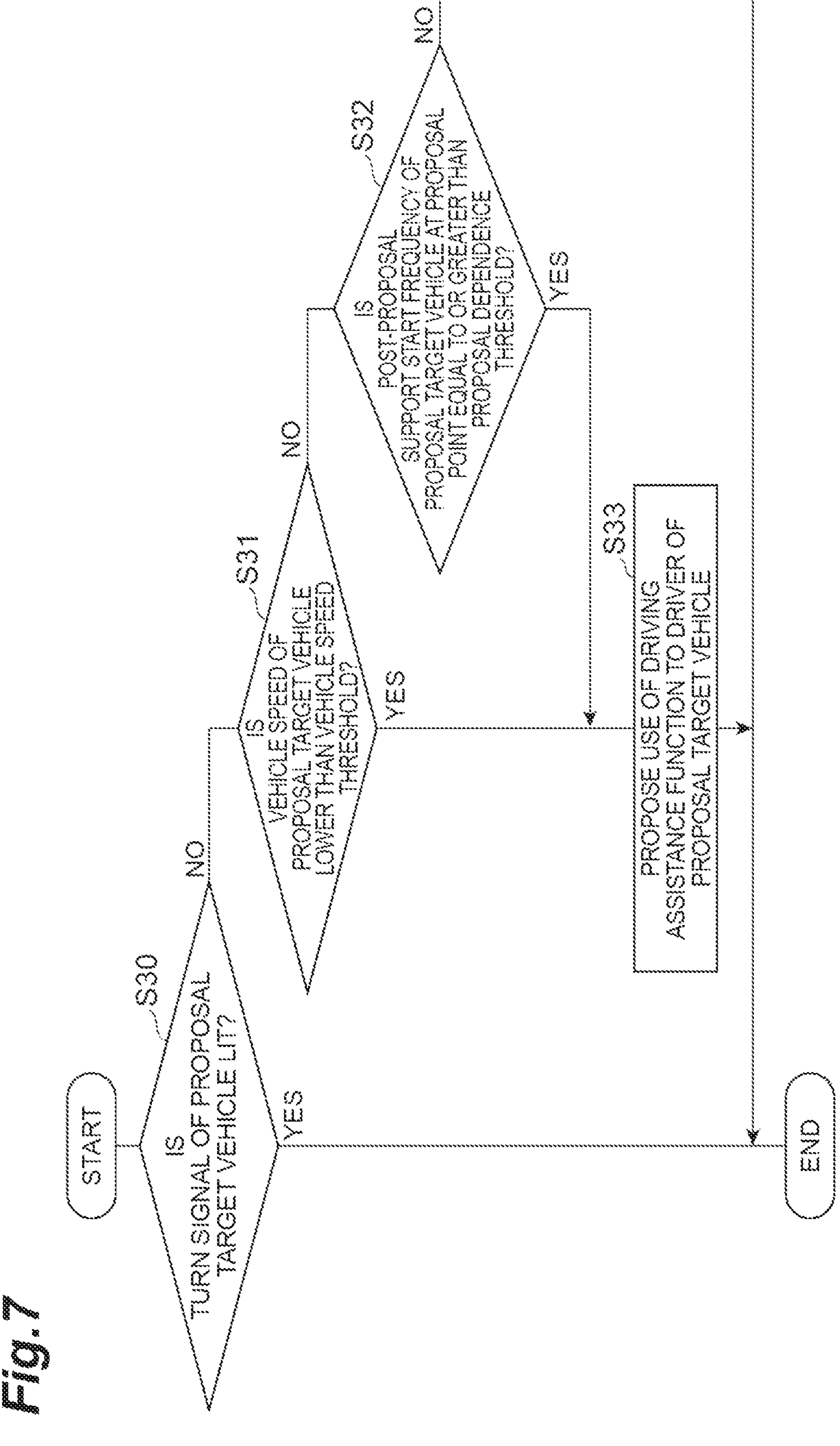
Fig.7
START
S30
IS
TURN SIGNAL OF PROPOSAL
TARGET VEHICLE LIT?
YES
NO
S31
IS
VEHICLE SPEED OF
PROPOSAL TARGET VEHICLE
LOWER THAN VEHICLE SPEED
THRESHOLD?
YES
NO
S32
IS
POST-PROPOSAL
SUPPORT START FREQUENCY OF
PROPOSAL TARGET VEHICLE AT PROPOSAL
POINT EQUAL TO OR GREATER THAN
PROPOSAL DEPENDENCE
THRESHOLD?
YES
NO
S33
PROPOSE USE OF DRIVING
ASSISTANCE FUNCTION TO DRIVER OF
PROPOSAL TARGET VEHICLE
END

DRIVING ASSISTANCE FUNCTION PROPOSAL SYSTEM AND PROPOSAL METHOD FOR DRIVING ASSISTANCE FUNCTION PROPOSAL SYSTEM

CROSS-REFERENCE TO RELATED APPLICATIONS

This application is based upon and claims the benefit of priority from Japanese Patent Application No. 2023-073003, filed on Apr. 27, 2023, the entire contents of which are incorporated herein by reference.

TECHNICAL FIELD

The present disclosure relates to a driving assistance function proposal system and a proposal method for a driving assistance function proposal system.

BACKGROUND

In the related art, Japanese Unexamined Patent Publication No. 2019-74803 is known as a technical document regarding a driving assistance function proposal system. This publication discloses a server device that acquires vehicle information as big data from a plurality of vehicles and stores recommended traveling situations in which use of vehicle functions possessed by the vehicles is recommended.

SUMMARY

Incidentally, in the server device of the related art described above, when a traveling situation of the vehicle reaches the recommended traveling situation determined on the basis of the big data acquired from the plurality of vehicles, the vehicle function corresponding to the recommended traveling situation is proposed to a driver of the vehicle. Therefore, a proposal of a vehicle function may not match preferences of the driver of the vehicle. There is concern that the driver may feel bothered due to unnecessary proposals.

An aspect of the present disclosure is a driving assistance function proposal system for acquiring an operation history of a driving assistance function including position information from a plurality of probe vehicles and proposing use of the driving assistance function corresponding to a proposal point set on the basis of the operation history to a driver of a proposal target vehicle when a determination is made that the proposal target vehicle has reached the proposal point, wherein: the driving assistance function proposal system does not propose the use of the driving assistance function to the driver when a prior use frequency of the driving assistance function for the proposal target vehicle at the proposal point is equal to or greater than a proposal unnecessariness threshold or when a number of prior uses of the driving assistance function for the proposal target vehicle at the proposal point is equal to or greater than the proposal unnecessariness threshold.

According to the driving assistance function proposal system according to an aspect of the present disclosure, it is possible to curb causing the driver of the proposal target vehicle to feel bothered due to an unnecessary proposal since it is considered that the driver understands the usefulness of the driving assistance function at the proposal point and then does not execute the driving assistance function.

In the above-described driving assistance function proposal system, when a turn signal of the proposal target vehicle determined to reach the proposal point is lit, use of the driving assistance function may not be proposed to the driver.

In the above-described driving assistance function proposal system, when a vehicle speed of the proposal target vehicle determined to reach the proposal point is equal to or higher than a vehicle speed threshold, the use of the driving assistance function may not be proposed to the driver.

In the above-described driving assistance function proposal system, even when the vehicle speed of the proposal target vehicle determined to reach the proposal point is equal to or higher than the vehicle speed threshold, the use of the driving assistance function may be proposed to the driver when a post-proposal assistance start frequency that is a frequency at which the driver starts use of the driving assistance function after the proposal at the proposal point is equal to or higher than a proposal dependence threshold.

In the above-described driving assistance function proposal system, when there is an uninstalled function that is a driving assistance function that is not installed in the proposal target vehicle and is purchasable by being downloaded from a server by the proposal target vehicle, the purchase of the uninstalled function may be proposed to the driver when a determination is made that the proposal target vehicle is located at the proposal point associated with the uninstalled function.

Another aspect of the present disclosure is a proposal method for a driving assistance function proposal system for acquiring an operation history of a driving assistance function including position information from a plurality of probe vehicles and proposing use of the driving assistance function corresponding to a proposal point set on the basis of the operation history to a driver of a proposal target vehicle when a determination is made that the proposal target vehicle reaches the proposal point, the proposal method for a driving assistance function proposal system including: not proposing the use of the driving assistance function to the driver when a prior use frequency of the driving assistance function for the proposal target vehicle at the proposal point is equal to or greater than a proposal unnecessariness threshold or when a number of prior uses of the driving assistance function for the proposal target vehicle at the proposal point is equal to or greater than the proposal unnecessariness threshold.

According to the proposal method for a driving assistance function proposal system according to another aspect of the present disclosure, it is possible to curb causing the driver to feel bothered due to an unnecessary proposal since it is considered that the driver understands the usefulness of the driving assistance function at the proposal point and then does not execute the driving assistance function.

According to an aspect of the present disclosure, it is possible to curb the driver feeling bothered due to the proposal of unnecessary driving assistance functions.

BRIEF DESCRIPTION OF THE DRAWINGS

FIG. 7 is a flowchart illustrating an example of additional determination processing that can be added to the driving assistance function proposal processing.

DETAILED DESCRIPTION

Hereinafter, embodiments of the present disclosure will be described with reference to the drawings.

Figure 1:
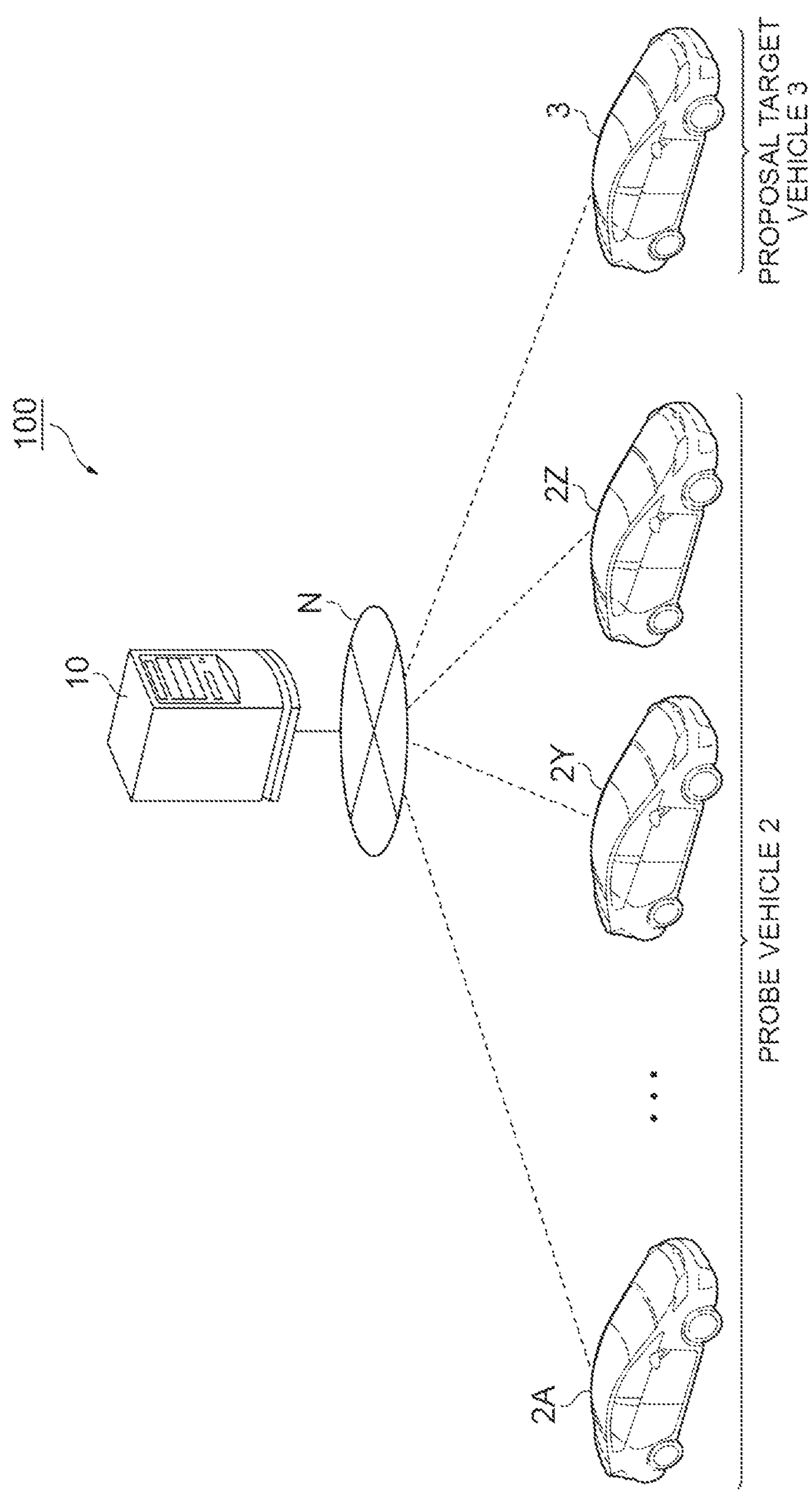
FIG. 1 is a block diagram illustrating a server of a driving assistance function proposal system according to an embodiment.

FIG. 1 is a block diagram illustrating a server 10 of a driving assistance function proposal system 100 according to an embodiment. As illustrated in FIG. 1, the driving assistance function proposal system 100 includes a server 10 that is communicatively connected to a probe vehicle 2 and a proposal target vehicle 3. The driving assistance function proposal system 100 uses information (big data) collected from the probe vehicles 2. The driving assistance function proposal system 100 is a system that performs the proposal of the use of a driving assistance function to the driver of the proposal target vehicle 3.

In the driving assistance function proposal system 100, a plurality of probe vehicles 2 (probe vehicles 2A to 2Z) and a proposal target vehicle 3 are communicatively connected to a server 10 via a network N. The network N is a wireless communication network such as the internet.

The driving assistance function is a function of assisting in driving operations of the driver. The driving assistance function includes, for example, a function regarding Advanced Driver Assistance Systems (ADAS). The driving assistance function includes at least one of adaptive cruise control (ACC), lane keeping assist (LKA), automatic overtaking function, automatic merging function, collision reduction braking (for example, pre-crash safety), rear side warning function (for example, blind spot monitor), night vision function (for example, night view), traffic sign recognition function (for example, road sign assist), stop assistance at the time of driver abnormality, coping function at the time of driver abnormality, automatic headlight adjustment assistance (for example, adaptive front lighting), parking assistance (for example, intelligent parking assist), lane change assistance, deceleration and steering assistance against obstacles (for example, proactive driving assist), preceding vehicle start notification function (for example, preceding vehicle start alarm), crossing vehicle notification function (for example, front cross traffic alert), deceleration assistance function, headlamp light distribution control, parking assistance, blind spot assistance, pedal pressing mistake prevention, reverse traveling prevention, and the like. The deceleration assistance function is executed at locations at which deceleration is required, such as intersections, roundabouts, and points at which emergency deceleration occurs frequently. The headlamp light distribution control includes at least one of automatic switching between headlamp ON and OFF, automatic switching between high beam and low beam, spot light distribution, and the like. The driving assistance function may include a package (for example, advanced drive) in which a plurality of functions is combined.

The probe vehicle 2 is a vehicle that is a target of information collection regarding proposal for the driving assistance function of the vehicle. The probe vehicle 2 is not a fully automated driving vehicle, but a vehicle operated for driving by a driver. The probe vehicles 2 do not need to be vehicles having the same configuration, and may be of different vehicle types. The probe vehicle 2 has a function of recognizing position information of the vehicle on a map using a global navigation satellite system (GNSS) or the like. Further, the probe vehicle 2 has a function of storing various driving assistance functions and an operation history of each driving assistance function.

The operation history is acquired in association with position information of the probe vehicle 2. The operation history includes an operation start position and an operation end position of the driving assistance function. Further, the operation history includes a use time of the driving assistance function. The operation history is acquired for each type of driving assistance function.

The probe vehicle 2 transmits various pieces of vehicle information including the operation history of the driving assistance function to the server 10. The vehicle information may include an identification ID for individually recognizing the probe vehicles 2. Information such as a vehicle type of the probe vehicle 2 and available driving assistance functions may be associated with the identification ID. The number of probe vehicles 2 connected to the server 10 is not particularly limited. The number of probe vehicles 2 may be one, ten, or one hundred or more. The probe vehicle 2 is not limited to a vehicle dedicated to information collection, and may include a general vehicle that has agreed to provide information. The probe vehicle 2 may be only a general vehicle.

The proposal target vehicle 3 is a vehicle that is a proposal target of a driving assistance function, and is a vehicle for which the driver has permitted the driving assistance function proposal service. A model of the proposal target vehicle 3 is not particularly limited as long as the proposal target vehicle 3 can use the driving assistance function. The number of proposal target vehicles 3 connected to the server 10 may be one, ten, or one hundred or more. The proposal target vehicle 3 may also serve as the probe vehicle 2. The proposal target vehicle 3 may be a vehicle that can purchase and download new driving assistance functions from the server 10.

The driving assistance function proposal system 100 acquires proposal target vehicle information including position information from the proposal target vehicle 3. The driving assistance function proposal system 100 performs the proposal of the use of the driving assistance functions to the driver of the proposal target vehicle 3 depending on the position of the proposal target vehicle 3.

[Server Configuration]

Figure 2:
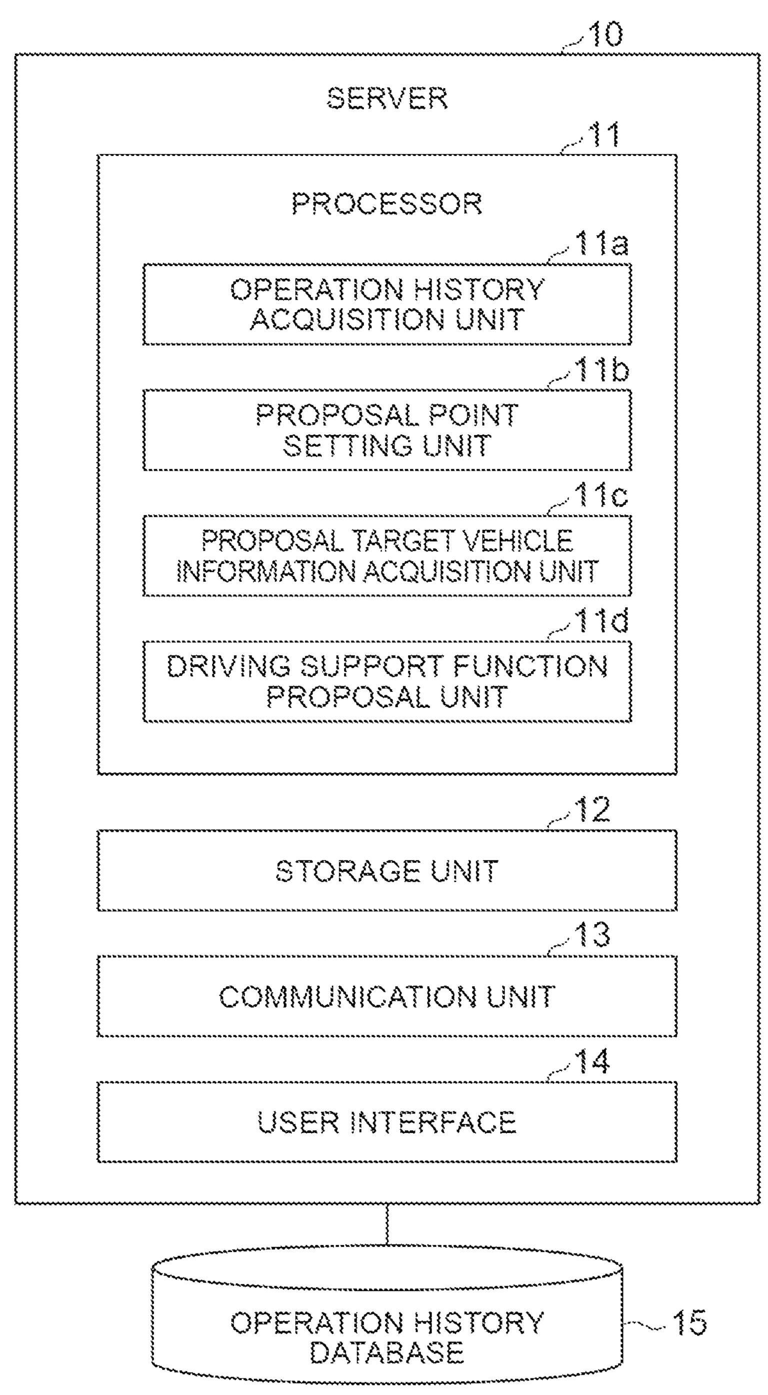
FIG. 2 is a block diagram illustrating an example of a configuration of a server.

Hereinafter, a configuration of the server 10 of the driving assistance function proposal system 100 will be described with reference to FIG. 2. FIG. 2 is a block diagram illustrating an example of a configuration of the server. The server 10 is installed in a facility such as an information management center, for example. The server 10 does not necessarily need to be installed in the facility, and may be mounted on a mobile object such as a vehicle or a ship. The server 10 may be configured in the cloud. The server 10 may be composed of multiple server computers.

As illustrated in FIG. 2, the server 10 is configured as a general computer including a processor 11, a storage unit 12, a communication unit 13, and a user interface 14.

The processor 11 controls the server 10 by operating an operating system, for example. The processor 11 is an arithmetic unit such as a central processing unit (CPU) that includes a control device, an arithmetic device, a register, and the like. The processor 11 controls the storage unit 12, the communication unit 13, and the user interface 14. The storage unit 12 includes at least one of a memory and a storage. The memory is a recording medium such as a read only memory (ROM) or a random-access memory (RAM). The storage is a recording medium such as a hard disk drive (HDD).

The communication unit 13 is a communication device for performing communication via the network N. For the communication unit 13, a network device, a network controller, a network card, or the like can be used. The user interface 14 is a device including an output device such as a display and a speaker, and an input device such as a touch panel.

The server 10 is connected to an operation history database 15. The operation history database 15 is a database that stores the operation history of the driving assistance function acquired from the probe vehicle 2. The operation history database 15 may store various pieces of information such as an identification ID of the probe vehicle 2, in addition to the operation history. The operation history database 15 can have a configuration similar to that of a well-known database.

Next, the functional configuration of the processor 11 will be described. As illustrated in FIG. 2, the processor 11 includes an operation history acquisition unit 11*a*, a proposal point setting unit 11*b*, a proposal target vehicle information acquisition unit 11*c*, and a driving assistance function proposal unit 11*d*. Some of functions of the processor 11 may be executed in the proposal target vehicle 3.

The operation history acquisition unit 11*a* acquires the operation history of the driving assistance function transmitted from the probe vehicle 2. The operation history acquisition unit 11*a* stores the operation history of the driving assistance function in the operation history database 15. The operation history acquisition unit 11*a* may store data in the operation history database 15 through data classification such as a type of driving assistance function operated by the probe vehicle 2, a use time of the driving assistance function, and a use section of the driving assistance function.

The proposal point setting unit 11*b* sets a proposal point on the basis of the operation history of the probe vehicle 2 stored in the operation history database 15. The proposal point is a point on a map used for the proposal of the use of the driving assistance function. The proposal point is set for each type of driving assistance function. The proposal point may be set by distinguishing a traveling direction of the road, or may be set for each lane.

Specifically, the proposal point setting unit 11*b* determines whether there is a candidate point at which a use frequency of the driving assistance function of the probe vehicle 2 is equal to or higher than a frequency determination threshold on the basis of the operation history. The use frequency corresponds to the number of probe vehicles 2 that have used the driving assistance functions among the probe vehicles 2 that passed through the point. The use frequency is obtained for each type of driving assistance function.

Candidate points are points that are candidates for the proposal point. The candidate points may be narrowed down to a road connection point, a starting point of a curve, an entrance point of an intersection, a point at which it is easy for a traffic jam to occur, or the like, or the candidate points may be statistically narrowed down to a point at which a frequency of use start of the driving assistance function is high. The frequency determination threshold is a threshold of a preset value. The frequency determination threshold may be set to a different value for each type of driving assistance function. Hereinafter, the threshold described in the present embodiment means a threshold having a preset value.

Conditions dependent on the type of driving assistance function may be added to the calculation of the use frequency. For example, in the case of a night vision function, the proposal point setting unit 11*b* may perform a determination of candidate points by using a use frequency limited to nighttime.

When the proposal point setting unit 11*b* determines that the above-described candidate point is preset, the proposal point setting unit 11*b* determines whether an average use time of the driving assistance function of the probe vehicle 2 at the candidate point is equal to or longer than a predetermined time. The average use time of the driving assistance function is an average value of a time for which the driving assistance function used at the proposal point is continuously used. The predetermined time may be set to a different value depending on the type of driving assistance function. The proposal point setting unit 11*b* sets candidate points whose average use time of the driving assistance function is longer than a predetermined time as proposal points.

In addition, the proposal point setting unit 11*b* may set, as a proposal target road, a road in which the use frequency of the driving assistance function is equal to or higher than a frequency determination threshold, and the average use time of the driving assistance function is equal to or greater than the predetermined time. The proposal point setting unit 11*b* may set an entrance point to the proposal target road from another road or the like as the proposal point. The proposal target may be an intersection instead of a road. The method of setting the proposal point is not limited to the above-described content. The server 10 does not necessarily need to include the proposal point setting unit 11*b*. The proposal point may be set in another server that does not constitute the driving assistance function proposal system 100.

The proposal target vehicle information acquisition unit 11*c* acquires the proposal target vehicle information transmitted from the proposal target vehicle 3. The proposal target vehicle information includes an identification ID and position information of the proposal target vehicle 3. The proposal target vehicle information includes information on the driving assistance function installed in the proposal target vehicle 3. The proposal target vehicle information also includes the operation history of the driving assistance function associated with the position information of the proposal target vehicle 3. The proposal target vehicle information may include the driving tendency of the driver, and may include driver preference information regarding the preference of the driver for driving assistance functions. The proposal target vehicle information may include vehicle type information of the proposal target vehicle 3.

The driving assistance function proposal unit 11*d* performs the proposal of the use of the driving assistance function to the driver of the proposal target vehicle 3. The driving assistance function proposal unit 11*d* does not perform the proposal of the use of driving assistance function that is already in use at a present point in time. The driving assistance function proposal unit 11*d* does not perform the proposal of the use of driving assistance functions that the driver is permitted to automatically start the use on the basis of a system determination. Further, the driving assistance function proposal unit 11*d* does not perform the proposal of the use of the driving assistance function when the proposal target vehicle 3 performs automated driving and the driver is not driving.

The driving assistance function proposal unit 11*d* determines whether the proposal target vehicle 3 reaches the proposal point on the basis of the position information of the proposal target vehicle 3 and the proposal point set by the proposal point setting unit 11*b*. For example, the driving assistance function proposal unit 11*d* determines that the proposal target vehicle 3 reaches the proposal point when the distance between the proposal point and the proposal target vehicle 3 becomes smaller than a distance threshold. The driving assistance function proposal unit 11*d* may determine that the proposal target vehicle 3 reaches the proposal point when a remaining time until the proposal target vehicle 3 reaches the proposal point becomes smaller than a remaining time threshold. The distance threshold and the remaining time threshold may be set to different values depending on the type of driving assistance function associated with the proposal point.

When the driving assistance function proposal unit 11*d* determines that the proposal target vehicle 3 reaches the proposal point, the driving assistance function proposal unit 11*d* determines whether the driving assistance function at the proposal point is not installed in the proposal target vehicle 3. The driving assistance function proposal unit 11*d* performs the above determination by comparing the driving assistance function corresponding to the proposal point with the driving assistance function installed in the proposal target vehicle 3.

When a determination is made that the driving assistance function at the proposal point is not installed, the driving assistance function proposal unit 11*d* may determine that the driving assistance function at the proposal point is an uninstalled function that the proposal target vehicle 3 can purchase by downloading the function from the server 10. The driving assistance function proposal unit 11*d* performs the above determination on the basis of a pre-stored list of driving assistance functions that can be sold by downloading, and the driving assistance functions that can be installed by downloading, which are linked to the identification ID of the proposal target vehicle 3. A server that sells the driving assistance functions is not limited to the server 10 and may be a different server.

When the driving assistance function proposal unit 11*d* determines that the driving assistance function at the proposal point is the uninstalled function that is purchasable by downloading, the driving assistance function proposal unit 11*d* may propose purchase of the uninstalled function to the driver of the proposal target vehicle 3. The driving assistance function proposal unit 11*d* transmits purchase proposal information to the proposal target vehicle 3, thereby performing a proposal of purchase of the uninstalled function to the driver through a display, speaker, or the like of the proposal target vehicle 3. This makes it possible to propose to the driver the purchase of the uninstalled function at the proposal point at which benefits of purchasing the driving assistance function can be visualized in a concrete manner.

When a determination is made that the driving assistance function associated with the proposal point is installed in the proposal target vehicle 3, the driving assistance function proposal unit 11*d* determines whether or not a prior use frequency of the driving assistance function of the proposal target vehicle 3 at the proposal point is equal to or greater than a proposal unnecessariness threshold.

The prior use frequency corresponds to a ratio of the number of times the proposal target vehicle 3 has used the driving assistance function (the driving assistance function associated with the proposal point) in advance to the number of times the proposal target vehicle 3 has passed the proposal point. The proposal unnecessariness threshold is set, for example, to a value for determining that the proposal is unnecessary because the driver understands the usefulness of the driving assistance function at the proposal point and then does not use the driving assistance function this time. The prior use frequency may be updated at regular intervals.

The driving assistance function proposal unit 11*d* may use the number of prior uses instead of the prior use frequency. The driving assistance function proposal unit 11*d* determines whether the number of prior uses the driving assistance function of the proposal target vehicle 3 at the proposal point is smaller than the proposal unnecessariness threshold. The number of prior uses is the number of times the proposal target vehicle 3 has previously used the driving assistance function (the driving assistance function associated with the proposal point) at the time of passing through the proposal point. The number of prior uses may be updated at regular intervals. When both the prior use frequency and the number of prior uses are used, values of the corresponding proposal unnecessariness thresholds are different.

When the driving assistance function proposal unit 11*d* determines that the prior use frequency or the number of prior uses of the driving assistance function of the proposal target vehicle 3 at the proposal point is equal to or greater than the proposal unnecessariness threshold, the driver is highly likely to understand the usefulness of the driving assistance function at the proposal point and then not to execute the driving assistance function this time. Therefore, the driving assistance function proposal unit 11*d* does not perform the proposal of the use of the driving assistance function to the driver of the proposal target vehicle 3. This makes it possible to curb unnecessary proposal to the driver.

When the proposal target vehicle 3 has a driver personal authentication function, the driving assistance function proposal unit 11*d* may acquire personal authentication information of the driver as the proposal target vehicle information, and count the prior use frequency or the number of prior uses of the driving assistance function for each driver.

When the driving assistance function proposal unit 11*d* determines that the prior use frequency or the number of prior uses of the driving assistance function of the proposal target vehicle 3 at the proposal point is not smaller than the proposal unnecessariness threshold, the driving assistance function proposal unit 11*d* performs the proposal of the use of the driving assistance function to the driver of the proposal target vehicle 3. The driving assistance function proposal unit 11*d* transmits proposal information to the proposal target vehicle 3, thereby performing the proposal of the use of the driving assistance function to the driver through the display, speaker, or the like of the proposal target vehicle 3.

The driving assistance function proposal unit 11*d* may notify the driver of the use frequency of the driving assistance function at the proposal point of the probe vehicle 2 or the number of using probe vehicles 2. The use frequency corresponds to a ratio of the number of times the driving assistance function (the driving assistance function associated with the proposal point) is used to the number of times the probe vehicle 2 passes through the proposal point. The number of using vehicles is the number of probe vehicles 2 that are using the driving assistance function associated with the proposal point at the time of passing through the proposal point. The use frequency and the number of using vehicles may be updated at regular intervals. Thus, it is possible to lower a hurdle for the driver of the proposal target vehicle 3 to try to use the driving assistance function by specifically transferring the use frequency and the number of vehicles using the driving assistance function.

The driving assistance function proposal unit 11*d* may perform a determination of the proposal of the driving assistance function on the basis of weather, day and night distinction, a situation of traffic congestion around the proposal target vehicle 3, and the like. The driving assistance function proposal unit 11*d* may change conditions depending on the type of driving assistance function. When the driving assistance function associated with the proposal point is the night vision function, the driving assistance function proposal unit 11*d* performs the proposal of the use to the driver when a determination is made that the day and night distinction indicates nighttime.

The driving assistance function proposal unit 11*d* may perform a proposal determination of the driving assistance function on the basis of a vehicle speed of the proposal target vehicle 3, lighting of a turn signal, and the like. The driving assistance function proposal unit 11*d* may not propose the use of the driving assistance function to the driver when the turn signal of the proposal target vehicle 3 determined to reach the proposal point is lit. Since the driver is considered to be conscious of performing a driving operation such as turning right, turning left, or changing lanes when the turn signal of the proposal target vehicle 3 is lit, it is possible to curb the proposal causing the driver to feel bothered, not by performing the proposal of the use of the driving assistance function.

The driving assistance function proposal unit 11*d* may perform the proposal of the use of the driving assistance function depending on the type of the driving assistance function even when the turn signal of the proposal target vehicle 3 is lit. For example, when a right turn is made at an intersection in a left-hand traffic country or region, the driving assistance function proposal unit 11*d* may perform the proposal of the use of the crossing vehicle notification function. The driving assistance function proposal unit 11*d* may perform the proposal of the use of the crossing vehicle notification function when a left turn is made at an intersection in a right-hand traffic country or region.

The driving assistance function proposal unit 11*d* may not propose the use of the driving assistance function to the driver when the vehicle speed of the proposal target vehicle 3 determined to reach the proposal point is equal to or higher than a vehicle speed threshold.

The vehicle speed threshold may be set to a different value depending on the proposal point. The vehicle speed threshold may be set to different values for an automobile-only road and a general road. The vehicle speed threshold may be set to an appropriate value to determine that the driver is in a hurry on the basis of a driving history of the driver of the proposal target vehicle 3. The vehicle speed threshold may be set as a value obtained by adding a predetermined value to an average vehicle speed of the driver. Since the driver is highly likely to be in a hurry to reach a destination when the vehicle speed of the proposal target vehicle 3 is high, it is possible to curb the proposal causing the driver to feel bothered, not by performing the proposal of the use of the driving assistance function.

Even when the vehicle speed of the proposal target vehicle 3 is equal to or higher than the vehicle speed threshold, the driving assistance function proposal unit 11*d* may perform the proposal of the use of the driving assistance function when a post-proposal assistance start frequency that is a frequency at which the driver starts use of the driving assistance function after the proposal at the proposal point is equal to or higher than a proposal dependence threshold. A value of the proposal dependence threshold is not particularly limited. An appropriate value may be set for the proposal dependence threshold in order to determine that the driver depends on the proposal of the use of the driving assistance function.

The post-proposal assistance start frequency is the number of times the driver of the proposal target vehicle 3 starts using the driving assistance function after the proposal among the number of times the proposal of the use of the driving assistance function to the driver at the proposal point is performed. Accordingly, when a frequency at which the driver depends on the proposal of the driving assistance function is high, the driver is highly likely not to feel bothered with the proposal, thereby promoting the use of the driving assistance function by performing the proposal. When the driving assistance function proposal unit 11*d* acquires the personal authentication information of the driver as the proposal target vehicle information, the driving assistance function proposal unit 11*d* may calculate the post-proposal assistance start frequency for each driver.

Figure 3:
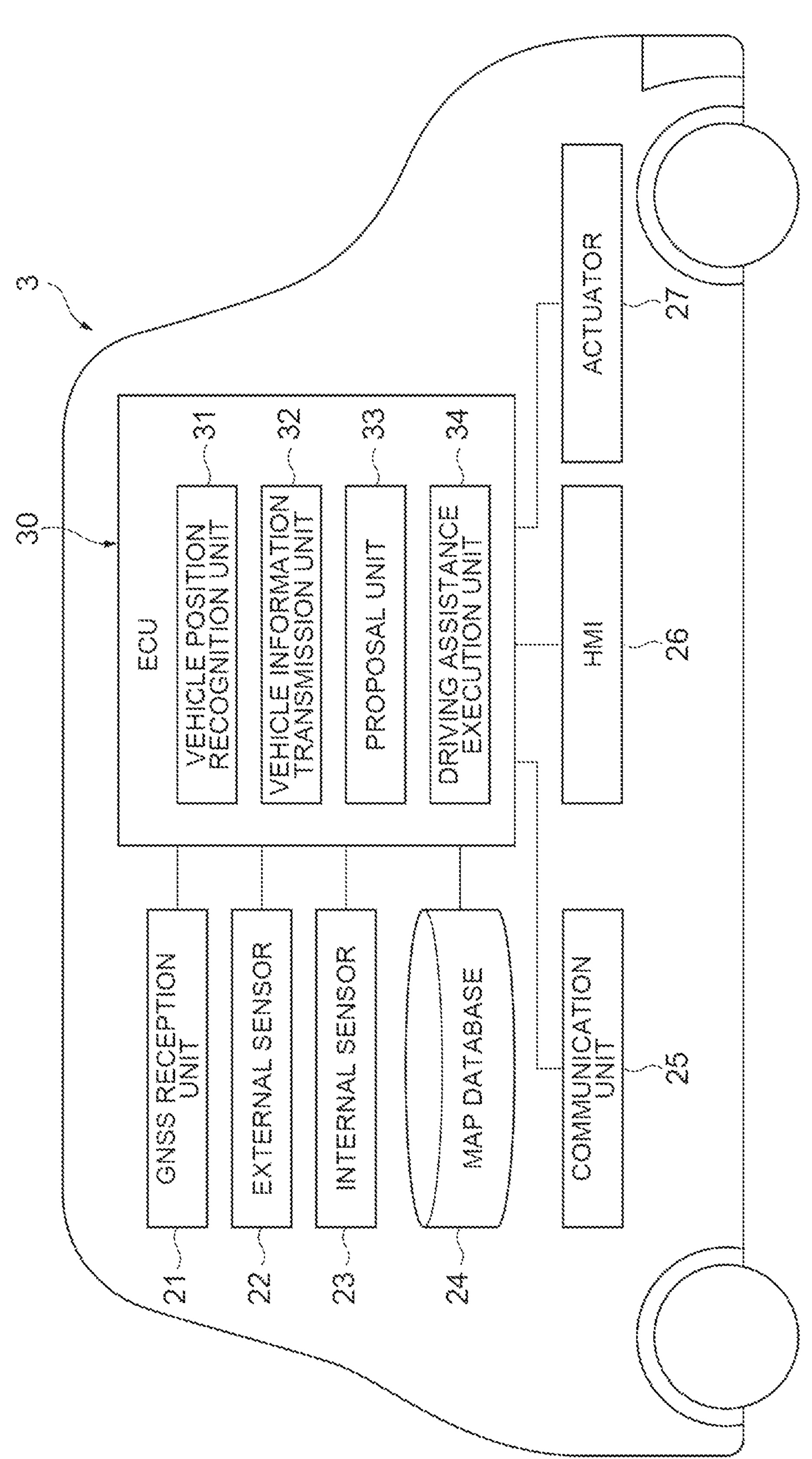
FIG. 3 is a block diagram illustrating an example of a configuration of a proposal target vehicle.

[Configuration of Proposal Target Vehicle] Next, an example of a configuration of the proposal target vehicle 3 will be described with reference to FIG. 3. FIG. 3 is a block diagram illustrating an example of the configuration of the proposal target vehicle 3.

As illustrated in FIG. 3, the proposal target vehicle 3 includes an electronic control unit (ECU) 30. The ECU 30 is an electronic control unit that includes a CPU, ROM, RAM, and the like. The ECU 30 realizes various functions by, for example, loading a program stored in a ROM into the RAM, and by the CPU executing the program loaded into the RAM. The ECU 30 may include a plurality of electronic units.

The ECU 30 is connected to a global navigation satellite System (GNSS) reception unit 21, an external sensor 22, an internal sensor 23, a map database 24, a communication unit 25, a human machine interface (HMI) 26, and an actuator 27.

The GNSS reception unit 21 measures the position of the proposal target vehicle 3 (for example, the latitude and longitude of the proposal target vehicle 3) by receiving signals from three or more positioning satellites. The GNSS reception unit 21 transmits the measured position information of the proposal target vehicle 3 to the ECU 30. The GNSS reception unit 21 may be a global positioning system (GPS) reception unit.

The external sensor 22 is a detection device that detects an external environment of the proposal target vehicle 3. The external sensor 22 includes at least one of a camera and a radar sensor. The camera is an imaging device that images the external environment of the proposal target vehicle 3. The radar sensor is a detection device that detects objects around the proposal target vehicle 3 by using radio waves (for example, millimeter waves) or light. The radar sensor includes, for example, a millimeter wave radar or lidar (Light Detection and Ranging).

The internal sensor 23 is a detection device that detects a vehicle state of the proposal target vehicle 3. The internal sensor 23 includes a vehicle speed sensor, an acceleration sensor, and a yaw rate sensor. The internal sensor 23 may include a turn signal detection unit that detects whether or not the turn signal of the proposal target vehicle 3 is lit. The internal sensor 23 may include a driving operation detection unit that detects a driving operation (steering, accelerator operation, brake operation, shift lever operation, or the like)

of the driver. The internal sensor 23 may detect the on/off state of various driving assistance functions.

The map database 24 is a database that stores map information. The map database 24 is formed in a storage device such as an HDD mounted on the proposal target vehicle 3, for example. The map information includes position information of a road, road shape information (for example, curvature information), position information of intersection points and branch points, and the like. The map information may include traffic regulation information such as legal speed associated with the position information.

The communication unit 25 is a communication device that controls wireless communication of the proposal target vehicle 3 with the outside. The communication unit 25 transmits and receives various pieces of information to and from the server 10 via the network N. The communication unit 25 transmits various pieces of information to the server 10 in response to a signal from the ECU 30.

The HMI 26 is an interface for inputting and outputting information between the ECU 30 and the driver. The HMI 26 includes, for example, a display, a speaker, and the like provided in a vehicle cabin. The HMI 26 performs image output of the display and audio output from the speaker in response to a control signal from the ECU 30. The display may be a head up display (HUD) or may be a display of a mobile terminal of the driver that is communicatively connected to the ECU 30.

The actuator 27 is a device that is used for control of the proposal target vehicle 3. The actuator 27 includes a drive actuator, a brake actuator, and a steering actuator that control engine output or motor output. The actuator 27 executes various driving assistance functions by controlling the traveling of the proposal target vehicle 3 under control signal from the ECU 30.

Next, the functional configuration of the ECU 30 will be described. As illustrated in FIG. 3, the ECU 30 includes a vehicle position recognition unit 31, a vehicle information transmission unit 32, a proposal unit 33, and a driving assistance execution unit 34.

The vehicle position recognition unit 31 recognizes the position of the proposal target vehicle 3 on the map on the basis of position information of the GNSS reception unit 21 and map information of the map database 24. The vehicle position recognition unit 31 may use position information of fixed obstacles such as utility poles included in the map information of the map database 24 and a detection result of the external sensor 22 to recognize the position of the proposal target vehicle 3 on the map using a simultaneous localization and mapping (SLAM) technology. The vehicle position recognition unit 31 may recognize the position of the proposal target vehicle 3 on the map using other known schemes.

The vehicle information transmission unit 32 transmits various pieces of information including the position information of the proposal target vehicle 3 to the server 10 as the proposal target vehicle information. The proposal target vehicle information also includes the identification ID of the proposal target vehicle 3. The proposal target vehicle information also includes the operation history of the driving assistance function associated with the position information. The proposal target vehicle information may include vehicle speed information of the proposal target vehicle 3, and may also include lighting information of the turn signal. The proposal target vehicle information may include information on the post-proposal assistance start frequency at which the driver starts use of the driving assistance function after the proposal. The vehicle information transmission unit 32 transmits other necessary information to the server 10.

The proposal unit 33 performs a proposal to the driver to use the driving assistance function on the basis of an instruction from the server 10. The proposal unit 33 transmits a control signal to the HMI 26 to propose the use of the driving assistance function to the driver by using a display, a speaker, or the like.

Figure 4:
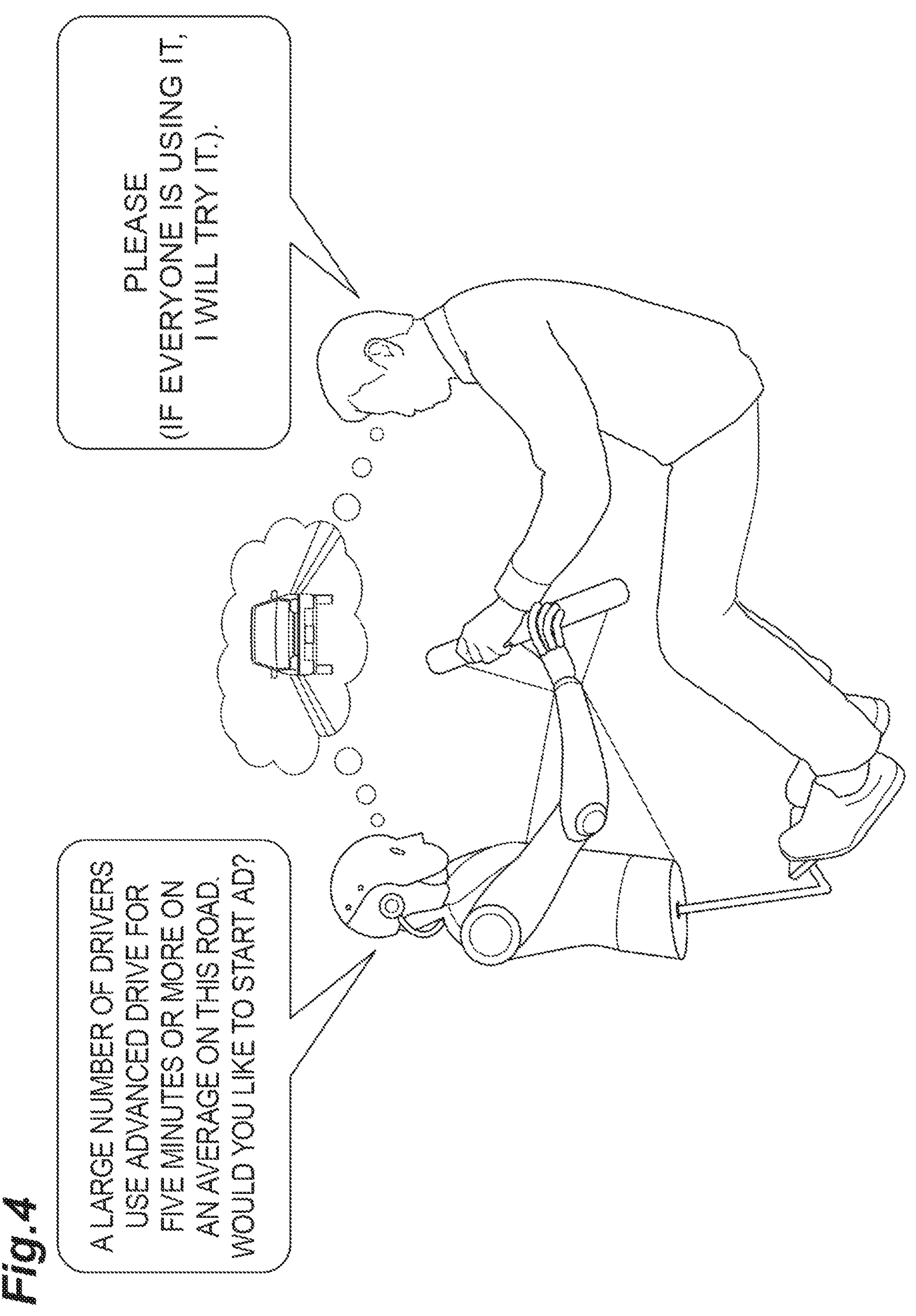
FIG. 4 is a diagram illustrating an example of a proposal of use of the driving assistance function to a driver.

FIG. 4 is a diagram illustrating an example of the proposal of the use of the driving assistance functions to the driver. As illustrated in FIG. 4, the proposal unit 33 proposes to the driver of the proposal target vehicle 3 that a large number of drivers activate advanced drive for five minutes or more on an average on a road including the proposal point, for example, through voice or text display. The illustrated advanced drive includes some of a plurality of driving assistance functions as a package. The proposal for the use of the driving assistance functions includes a proposal as a package.

The proposal unit 33 may have a voice recognition function. When the proposal unit 33 recognizes, by voice, a driver's instruction to use the driving assistance function via a microphone of the HMI 26, the proposal unit 33 may activate the driving assistance function.

The driving assistance execution unit 34 executes the driving assistance function of the proposal target vehicle 3. The driving assistance execution unit 34 executes various driving assistance functions by transmitting a control signal to the HMI 26 or the actuator 27. Detailed description of the execution of the driving assistance function will be omitted.

The driving assistance function proposal system 100 may cause at least some of the functions of the driving assistance function proposal unit 11*d* of the server 10 to be performed on the proposal target vehicle 3 side. The proposal unit 33 of the proposal target vehicle 3 may determine whether the proposal target vehicle 3 reaches the proposal point by acquiring information regarding the proposal point from the server 10. The proposal unit 33 may determine whether the driving assistance function at the proposal point is not installed in the proposal target vehicle 3 on the basis of the driving assistance function associated with the proposal point. The proposal unit 33 may determine, through communication with the server 10, whether the driving assistance function at the proposal point is an uninstalled function that the proposal target vehicle 3 can purchase by downloading the function from the server 10. When the proposal unit 33 determines that the driving assistance function at the proposal point is the uninstalled function that is purchasable by downloading, the proposal unit 33 may propose purchase of the uninstalled function to the driver of the proposal target vehicle 3.

Further, when the proposal unit 33 determines that the driving assistance function at the proposal point is installed in the proposal target vehicle 3, the proposal unit 33 may determine whether the prior use frequency of the driving assistance function of the proposal target vehicle 3 at the proposal point is smaller than the proposal unnecessariness threshold. When the proposal unit 33 determines that the prior use frequency or the number of prior uses of the driving assistance function greater than or equal to the proposal unnecessariness threshold, the proposal unit 33 performs the proposal of the use of the driving assistance function to the driver of the proposal target vehicle 3, and when a determination is made that the prior use frequency or the number of prior uses of the driving assistance function is less than the proposal unnecessariness threshold, it may not perform the proposal of the use of the driving assistance function to the driver of the proposal target vehicle 3. In addition, the proposal unit 33 may be able to execute all the functions of the driving assistance function proposal unit 11*d*. In the driving assistance function proposal system 100, when the proposal unit 33 can execute all the functions of the driving assistance function proposal unit 11*d* described above, the server 10 does not need to include the driving assistance function proposal unit 11*d*.

[Processing of Driving Assistance Function Proposal System]

Figure 5:
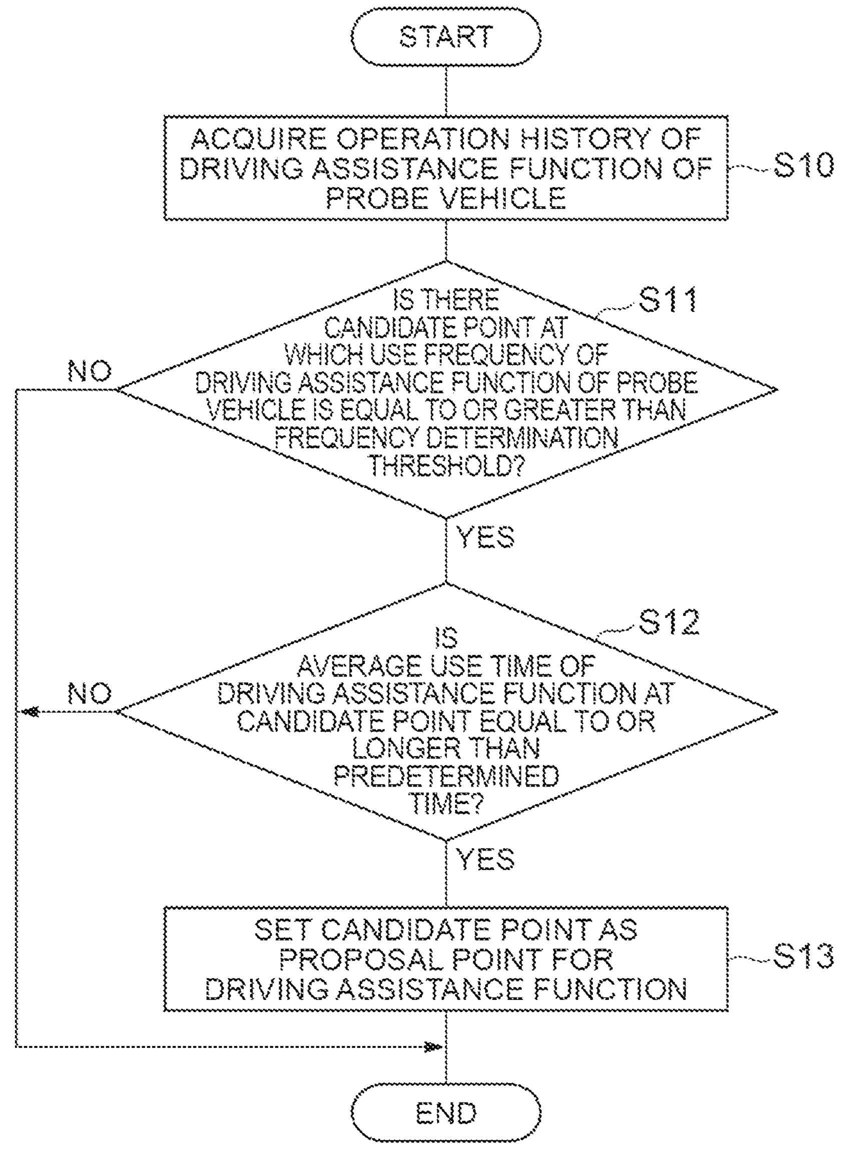
FIG. 5 is a flowchart illustrating an example of proposal point setting processing of the driving assistance function proposal system.

Next, processing of the driving assistance function proposal system 100 in the present embodiment will be described with reference to the drawings. FIG. 5 illustrates a flowchart illustrating an example of proposal point setting processing of the driving assistance function proposal system 100. The proposal point setting processing is executed periodically by the server 10, for example.

As illustrated in FIG. 5, in S10, the server 10 of the driving assistance function proposal system 100 acquires the operation history of the driving assistance function of the probe vehicle 2 using the operation history acquisition unit 11*a*. The operation history acquisition unit 11*a* recognizes, for example, the type of driving assistance function operated by the probe vehicle 2, the use time of the driving assistance function, and the use section of the driving assistance function. Thereafter, the server 10 proceeds to S11.

In S11, the server 10 uses the proposal point setting unit 11*b* to determine whether there is a candidate point at which the use frequency of the driving assistance function of the probe vehicle 2 is equal to or higher than the frequency determination threshold. When the server 10 determines that there is a candidate point, the server 10 proceeds to S12. When the server 10 determines that there is no candidate point, the server 10 ends the proposal point setting processing.

In S12, the server 10 uses the proposal point setting unit 11*b* to determine whether the average use time of the driving assistance function of the probe vehicle 2 at the candidate point is equal to or longer than the predetermined time. When the server 10 determines that the average use time of the driving assistance function is equal to or longer than the predetermined time, the server 10 proceeds to S13. When the server 10 does not determine that the average use time of the driving assistance function is equal to or longer than the predetermined time, the server 10 ends the proposal point setting processing.

In S13, the server 10 uses the proposal point setting unit 11*b* to set the candidate point as the proposal point. The proposal point setting unit 11*b* sets a candidate point whose average use time of the driving assistance function is equal to or longer than the predetermined time as the proposal point. Thereafter, the server 10 ends the proposal point setting processing. The proposal point may be re-determined at regular intervals and deleted when conditions of S11 and S12 are not satisfied.

Figure 6:
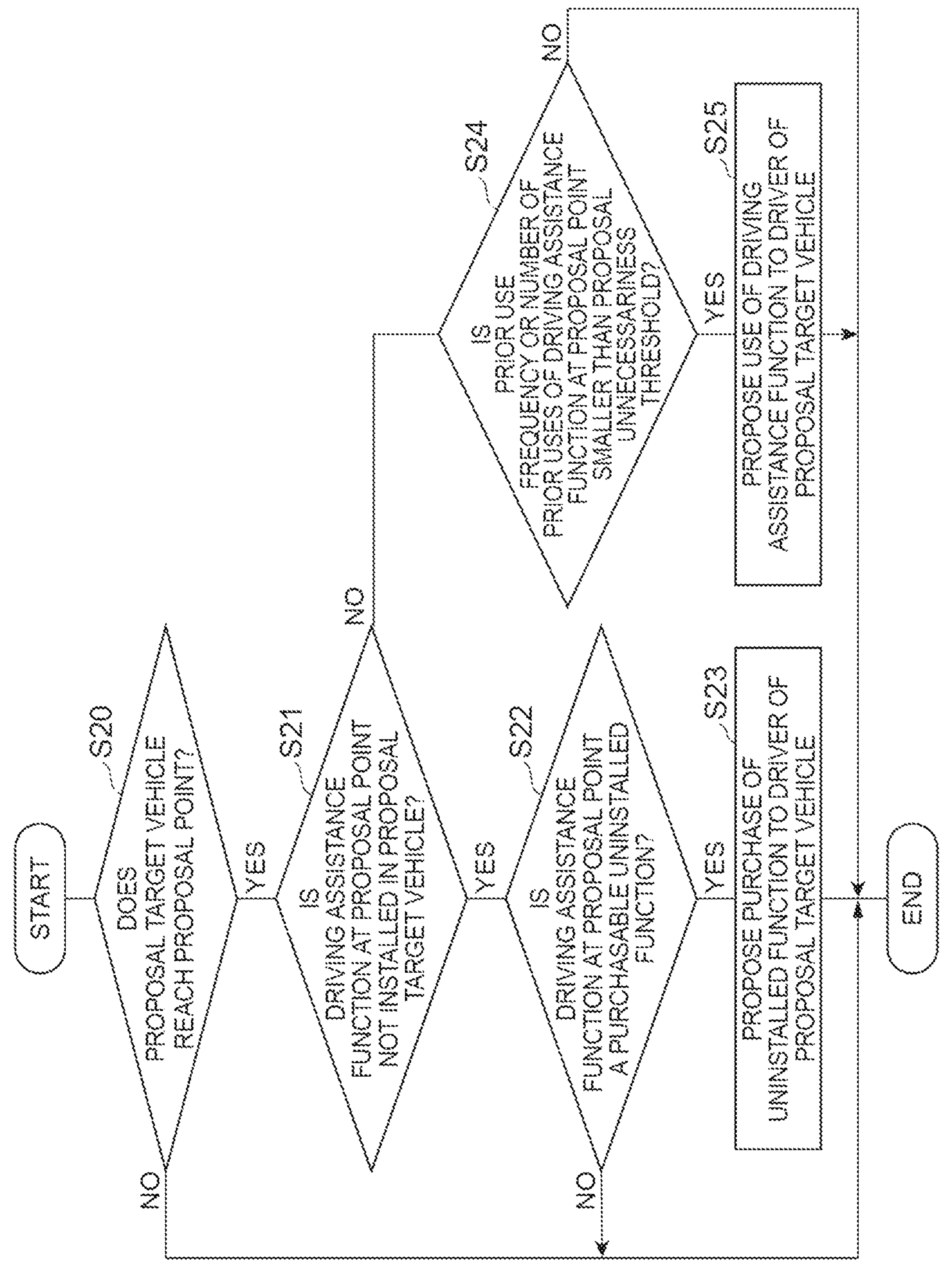
FIG. 6 is a flowchart illustrating an example of driving assistance function proposal processing of the driving assistance function proposal system.

FIG. 6 is a flowchart illustrating an example of driving assistance function proposal processing (driving assistance function proposal method) of the driving assistance function proposal system 100. The driving assistance function proposal processing is executed when the driver permits the driving assistance function proposal service in the proposal target vehicle 3. The driving assistance function proposal processing is repeatedly executed, for example, at regular intervals.

As illustrated in FIG. 6, in S20, the server 10 uses the driving assistance function proposal unit 11*d* to determine whether the proposal target vehicle 3 reaches the proposal point. For example, the driving assistance function proposal unit 11*d* determines that the proposal target vehicle 3 reaches the proposal point when the distance between the proposal point and the proposal target vehicle 3 becomes smaller than the distance threshold. When the server 10 determines that the proposal target vehicle 3 reaches the proposal point, the server 10 proceeds to S21. When the server 10 does not determine that the proposal target vehicle 3 reaches the proposal point, the server 10 ends the driving assistance function proposal processing.

In S21, the server 10 uses the driving assistance function proposal unit 11*d* to determine whether the driving assistance function at the proposal point is not installed in the proposal target vehicle 3. When the server 10 determines that the driving assistance function at the proposal point is not installed in the proposal target vehicle 3, the server 10 proceeds to S22. When the server 10 does not determine that the driving assistance function at the proposal point is not installed in the proposal target vehicle 3, the server 10 proceeds to S24.

In S22, the server 10 uses the driving assistance function proposal unit 11*d* to determine whether the driving assistance function at the proposal point is an uninstalled function that the proposal target vehicle 3 can purchase by downloading the function from the server 10. When the server 10 determines that the function is the uninstalled function that is purchasable by downloading, the server 10 proceeds to S23. When the server 10 does not determine that the function is the uninstalled function that is purchasable by downloading, the server 10 ends the driving assistance function proposal processing.

In S24, the server 10 uses the driving assistance function proposal unit 11*d* to determine whether the prior use frequency or the number of prior uses of the driving assistance function of the proposal target vehicle 3 at the proposal point is smaller than the proposal unnecessariness threshold. When the server 10 determines that the prior use frequency or the number of prior uses is smaller than the proposal unnecessariness threshold, the server 10 proceeds to S25. When the server 10 determines that the prior use frequency or the number of prior uses is not smaller than the proposal unnecessariness threshold, the server 10 ends the driving assistance function proposal processing.

In S25, the server 10 uses the driving assistance function proposal unit 11*d* to perform the proposal of the use of the driving assistance function to the driver of the proposal target vehicle 3. The driving assistance function proposal unit 11*d* transmits the proposal information to the proposal target vehicle 3, thereby performing the proposal of the use of the driving assistance function to the driver through the HMI 26 of the proposal target vehicle 3. Thereafter, the server 10 ends the driving assistance function proposal processing.

FIG. 7 is a flowchart illustrating an example of an additional determination processing that can be added to the driving assistance function proposal processing. The server 10 of the driving assistance function proposal system 100 can execute the additional determination processing illustrated in the flowchart illustrated in FIG. 7, for example, instead of the processing of S25 of FIG. 6.

As illustrated in FIG. 7, in S30, the server 10 uses the driving assistance function proposal unit 11*d* to determine whether the turn signal of the proposal target vehicle 3 is lit. When the server 10 determines that the turn signal of the proposal target vehicle 3 is lit, the server 10 ends the driving assistance function proposal processing including the additional determination processing. When the server 10 determines that the turn signal of the proposal target vehicle 3 is not lit, the server 10 proceeds to S31.

In S31, the server 10 uses the driving assistance function proposal unit 11*d* to determine whether the vehicle speed of the proposal target vehicle 3 is lower than the vehicle speed threshold. When the server 10 determines that the vehicle speed of the proposal target vehicle 3 is lower than the vehicle speed threshold, the server 10 proceeds to S33. When the server 10 determines that the vehicle speed of the proposal target vehicle 3 is not lower than the vehicle speed threshold, the server 10 proceeds to S32.

In S32, the server 10 uses the driving assistance function proposal unit 11*d* to determine whether the post-proposal assistance start frequency of the proposal target vehicle 3 at the proposal point is equal to or greater than the proposal dependence threshold. When the server 10 determines that the post-proposal assistance start frequency is equal to or higher than the proposal dependence threshold, the server 10 proceeds to S33. When the server 10 determines that the post-proposal assistance start frequency is not equal to or greater than the proposal dependence threshold, the server 10 ends the driving assistance function proposal processing including the additional determination processing.

In S33, the server 10 uses the driving assistance function proposal unit 11*d* to perform the proposal of the use of the driving assistance function to the driver of the proposal target vehicle 3. Thereafter, the server 10 ends the driving assistance function proposal processing.

According to the driving assistance function proposal system 100 and the driving assistance function proposal method for the driving assistance function proposal system 100 according to the embodiment described above, it is possible to curb the annoyance caused to the driver by an unnecessary proposal, since it is considered that the driver of the proposal target vehicle 3 understands the usefulness of the driving assistance function at the proposal point and therefore does not execute the driving assistance function.

Further, in the driving assistance function proposal system 100, since the driver is considered to be conscious of performing a driving operation such as turning right, turning left, or changing lanes when the turn signal of the proposal target vehicle 3 is lit, it is possible to curb the annoyance caused to the driver by the proposal, by not making a proposal for the use of the driving assistance function.

Further, in the driving assistance function proposal system 100, since the driver is likely to be in a hurry to reach a destination when the vehicle speed of the proposal target vehicle 3 is high, it is possible to curb the annoyance caused to the driver by the proposal, by not making a proposal for the use of the driving assistance function when the vehicle speed is equal to or greater than the vehicle speed threshold.

Further, in the driving assistance function proposal system 100, even when the vehicle speed of the proposal target vehicle 3 is equal to or greater than the vehicle speed threshold, the driver is considered to rely on the proposal of the driving assistance function when the post-proposal assistance start frequency at the proposal point is equal to or greater than the proposal dependence threshold, and thus, the driver is highly likely not to feel bothered with the proposal for the use of the driving assistance functions, thereby promoting the use of the driving assistance function by making the proposal.

Although the embodiments of the present disclosure have been described above, the present disclosure is not limited to the above-described embodiments. The present disclosure can be implemented in various forms including the embodiments described above, with various changes and improvements based on the knowledge of those skilled in the art.

The driving assistance function proposal system 100 does not necessarily need to perform a determination of an uninstalled function or proposal of the purchase of the uninstalled function. A server that sets the proposal point and a server that performs the proposal of the use of the driving assistance function may be separate servers.

What is claimed is:

1. A driving assistance function proposal system configured to:

acquire an operation history of a driving assistance function used by a plurality of probe vehicles, the operation history including position information from the plurality of probe vehicles when the driving assistance function is operated;

set a proposal point at which a use frequency of the driving assistance function by one of the probe vehicles is greater than a predetermined threshold on a basis of the operation history;

determine whether a prior use frequency of the driving assistance function for the proposal target vehicle at the proposal point is equal to or greater than a proposal unnecessariness threshold;

determine whether a number of prior uses of the driving assistance function for the proposal target vehicle at the proposal point is equal to or greater than the proposal unnecessariness threshold; and upon determination that the prior use frequency of the driving assistance function for the proposal target vehicle at the proposal point is not equal to or greater than the proposal unnecessariness threshold and the number of prior uses of the driving assistance function for the proposal target vehicle at the proposal point is not equal to or greater than the proposal unnecessariness threshold, propose use of the driving assistance function to a driver of the proposal target vehicle at the proposal point.

2. The driving assistance function proposal system according to claim 1, wherein when a turn signal of the proposal target vehicle determined to reach the proposal point is lit, the use of the driving assistance function is not proposed to the driver.

3. The driving assistance function proposal system according to claim 1, wherein when a vehicle speed of the proposal target vehicle determined to reach the proposal point is equal to or greater than a vehicle speed threshold, the use of the driving assistance function is not proposed to the driver.

4. The driving assistance function proposal system according to claim 2, wherein when a vehicle speed of the proposal target vehicle determined to reach the proposal point is equal to or greater than a vehicle speed threshold, the use of the driving assistance function is not proposed to the driver.

5. The driving assistance function proposal system according to claim 3, wherein when the vehicle speed of the proposal target vehicle determined to reach the proposal point is equal to or greater than the vehicle speed threshold, the use of the driving assistance function is proposed to the driver when a post-proposal assistance start frequency that is a frequency at which the driver starts use of the driving assistance function after the proposal at the proposal point is equal to or greater than a proposal dependence threshold.

6. The driving assistance function proposal system according to claim 4, wherein when the vehicle speed of the proposal target vehicle determined to reach the proposal point is equal to or greater than the vehicle speed threshold, the use of the driving assistance function is proposed to the driver when a post-proposal assistance start frequency that is a frequency at which the driver starts use of the driving assistance function after the proposal at the proposal point is equal to or greater than a proposal dependence threshold.

7. The driving assistance function proposal system according to claim 1, wherein when there is an uninstalled function that is a driving assistance function that is not installed in the proposal target vehicle and is purchasable by being downloaded from a server by the proposal target vehicle, a purchase of the uninstalled function is proposed to the driver when a determination is made that the proposal target vehicle is located at the proposal point associated with the uninstalled function.

8. The driving assistance function proposal system according to claim 2, wherein when there is an uninstalled function that is a driving assistance function that is not installed in the proposal target vehicle and is purchasable by being downloaded from a server by the proposal target vehicle, a purchase of the uninstalled function is proposed to the driver when a determination is made that the proposal target vehicle is located at the proposal point associated with the uninstalled function.

9. A proposal method for a driving assistance function proposal system comprising:

acquiring an operation history of a driving assistance function used by a plurality of probe vehicles, the operation history including position information from the plurality of probe vehicles when the driving assistance function is operated;

setting a proposal point at which a use frequency of the driving assistance function by one of the probe vehicles is greater than a predetermined threshold on a basis of the operation history;

determining whether a prior use frequency of the driving assistance function for the proposal target vehicle at the proposal point is equal to or greater than a proposal unnecessariness threshold;

determining whether a number of prior uses of the driving assistance function for the proposal target vehicle at the proposal point is equal to or greater than the proposal unnecessariness threshold; and upon determination that the prior use frequency of the driving assistance function for the proposal target vehicle at the proposal point is not equal to or greater than the proposal unnecessariness threshold and the number of prior uses of the driving assistance function for the proposal target vehicle at the proposal point is not equal to or greater than the proposal unnecessariness threshold, proposing use of the driving assistance function to a driver of the proposal target vehicle at the proposal point.

* * * * *